US010891210B2

(12) United States Patent
Craik et al.

(10) Patent No.: US 10,891,210 B2
(45) Date of Patent: *Jan. 12, 2021

(54) DATAFLOW ANALYSIS TO REDUCE THE OVERHEAD OF ON STACK REPLACEMENT

(71) Applicant: International Business Machines Corporation, Armonk, NY (US)

(72) Inventors: Andrew Craik, North York (CA); Joseph Devin Micheal Papineau, Markham (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,200

(22) Filed: Jul. 16, 2019

(65) Prior Publication Data

US 2019/0340102 A1    Nov. 7, 2019

Related U.S. Application Data

(63) Continuation of application No. 15/859,965, filed on Jan. 2, 2018, now Pat. No. 10,592,387.

(51) Int. Cl.
*G06F 11/36* (2006.01)
*G06F 9/455* (2018.01)
*G06F 8/41* (2018.01)

(52) U.S. Cl.
CPC ........ *G06F 11/3612* (2013.01); *G06F 8/4441* (2013.01); *G06F 8/4443* (2013.01);
(Continued)

(58) Field of Classification Search
CPC .................................................. G06F 11/3612
(Continued)

(56) References Cited

U.S. PATENT DOCUMENTS 8,782,434 B1    7/2014  Ghose et al.
9,146,759 B2    9/2015  Porras et al.
(Continued)

OTHER PUBLICATIONS

Steiner et al., "Adaptive Inlining and on-Stack Replacement in the CACAO Virtual Machine," Proceedings of the 5th international symposium on Principles and practice of programming in Java, Sep. 2007, Lisbon, Portugal, 6 pages.
(Continued)

*Primary Examiner* — John Q Chavis
(74) *Attorney, Agent, or Firm* — VanLeeuwen & VanLeeuwen; Christopher M. Pignato

(57) ABSTRACT

An approach is provided in which an information handling system selects an assumption point in a software program corresponding to a compile-time assumption made by a compiler, and selects an assumption violation point in the software program corresponding to a location at which the compile-time assumption can be violated at runtime. The information handling system propagates backwards in the software program from the assumption point and reaches the assumption violation point. The information handling system determines that the assumption point corresponds to a first method and the assumption violation point corresponds to a second method that is different from the first method, and inserts a conditional transition in the software program at the assumption violation point. The information handling system executes a compiled version of the software program that includes the conditional transition.

20 Claims, 9 Drawing Sheets

(52) U.S. Cl.
CPC ........ *G06F 9/4552* (2013.01); *G06F 9/45525* (2013.01); *G06F 9/45529* (2013.01)

(58) Field of Classification Search
USPC ........................................................ 717/148
See application file for complete search history.

(56) References Cited

U.S. PATENT DOCUMENTS

| | | | |
|---|---|---|---|
| 9,389,843 | B2 | 7/2016 | Chapman et al. |
| 9,389,889 | B2 | 7/2016 | Kimura |
| 9,424,004 | B2 | 8/2016 | Miadowicz et al. |
| 9,495,138 | B1 | 11/2016 | Frazier et al. |
| 10,592,387 | B2 * | 3/2020 | Craik ................ G06F 9/45525 |
| 2006/0048116 | A1 | 3/2006 | Inglis |
| 2006/0150160 | A1 | 7/2006 | Taft |
| 2008/0313613 | A1 | 12/2008 | Bierhoff |
| 2011/0148876 | A1 | 6/2011 | Akenine-Moller et al. |
| 2013/0205282 | A1 | 8/2013 | Lafreniere et al. |
| 2014/0053143 | A1 | 2/2014 | Conrod et al. |
| 2014/0325493 | A1 | 10/2014 | Stoodley et al. |
| 2015/0378694 | A1 | 12/2015 | Lagergren et al. |
| 2016/0092174 | A1 | 3/2016 | Miadowicz et al. |
| 2016/0299746 | A1 | 10/2016 | De et al. |
| 2017/0269915 | A1 | 9/2017 | Pirvu |
| 2017/0286076 | A1 | 10/2017 | De et al. |
| 2019/0205240 | A1 | 7/2019 | Craik et al. |

OTHER PUBLICATIONS

Soman et al., "Efficient and General on-Stack Replacement for Aggressive Program Specialization," 2006 International Conference on Programming Languages and Compilers (PLC'06), Jun. 26-29, Las Vegas, NV, 8 pages.

D'Elia et al. "Flexible on-Stack Replacement in LLVM," Proceedings of the 2016 International Symposium on Code Generation and Optimization, Mar. 2016, Barcelona, Spain, pp. 250-260.

"List of IBM Patents or Patent Applications Treated as Related," Letter from Leslie A. Van Leeuwen, Jul. 16, 2019, 1 page.

* cited by examiner

DATAFLOW ANALYSIS TO REDUCE THE OVERHEAD OF ON STACK REPLACEMENT

BACKGROUND

Java, by default: (i) receives bytecode (for example, bytecode received from a Java compiler); (ii) interprets the bytecode into native machine language using a Java Virtual Machine (JVM) interpreter; and (iii) executes the native machine language code. A line-by-line type interpreter reads the bytecode line-by-line and translates the bytecode to native machine code as each line of bytecode is being executed by an operating system. To improve software performance, modern JVMs include a Just-in-Time (JIT) compiler. A JIT compiler translates byte code on a method-by-method basis, or a frequently-executed-instruction-sequence-by-frequently-executed-instruction-sequence basis. JIT translation typically executes faster than line-by-line translation. JIT compilers also perform optimizations to further increase performance, one of which is referred to as 'inlining,' where the JIT compiler replaces a method call with an intermediate representation of the target method.

During compilation of a Java method, a JIT compiler may make assumptions about the program being executed to simplify the code (simplifying assumptions) and increase overall performance. For example, the JIT compiler may assume that a final field is never written, that a given method is not overridden, or any number of other simplifying assumptions. Making these simplifying assumptions allows the JIT compiler to generate a more efficient native implementation. For each assumption, the JIT compiler also generates code to handle situations if the assumption is violated (not correct) at runtime.

JVMs also employ a runtime execution mode referred to as Hot Code Replace (HCR). HCR is a JVM execution mode where the executing program or an external agent attached to the JVM is allowed to redefine classes at runtime. HCR requires that when a class is redefined, the 'shape' of the class remains constant (fields and methods cannot be added and removed, for example), but the bytecode contents of methods can be changed. This mode is often used to allow editors to dynamically update the implementation of executing methods and as a means of building performance profiling tools.

BRIEF SUMMARY

According to one embodiment of the present disclosure, an approach is provided in which an information handling system selects an assumption point in a software program corresponding to a compile-time assumption made by a compiler, and selects an assumption violation point in the software program corresponding to a location at which the compile-time assumption can be violated at runtime. The information handling system propagates backwards in the software program from the assumption point and reaches the assumption violation point. The information handling system determines that the assumption point corresponds to a first method and the assumption violation point corresponds to a second method that is different from the first method, and inserts a conditional transition in the software program at the assumption violation point. The information handling system executes a compiled version of the software program that includes the conditional transition.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) selecting an assumption point in a software program corresponding to a compile-time assumption made by a compiler; (ii) selecting an assumption violation point corresponding to a location in the software program at which the compile-time assumption can be violated at runtime; (iii) propagating backwards in the software program from the assumption point and reaching the assumption violation point; (iv) determining that the assumption point corresponds to a first method and the assumption violation point corresponds a second method that is different from the first method; (v) inserting a conditional transition in the software program at the assumption violation point in response to the determining; and (vi) executing a compiled version of the software program that comprises the conditional transition.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
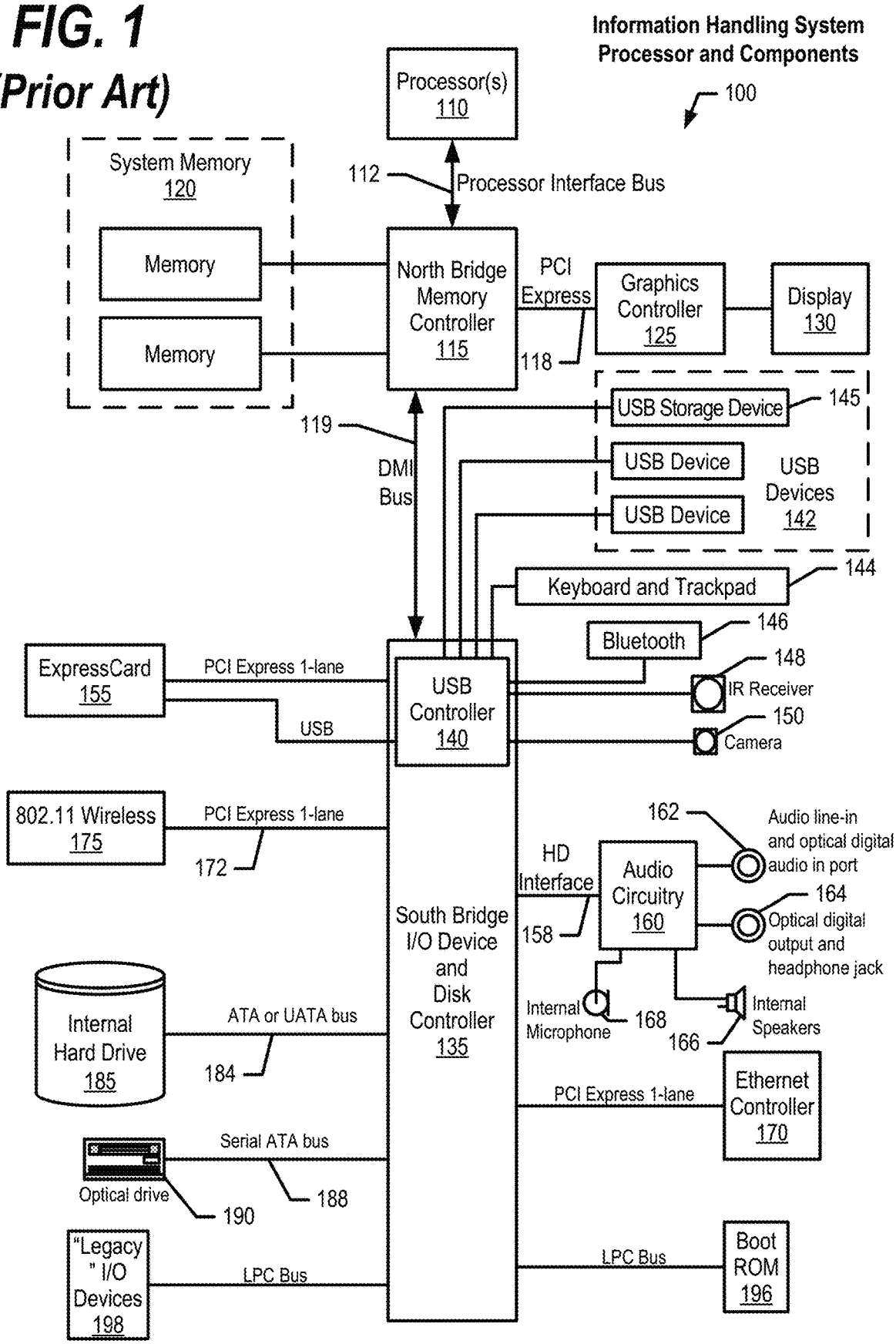
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
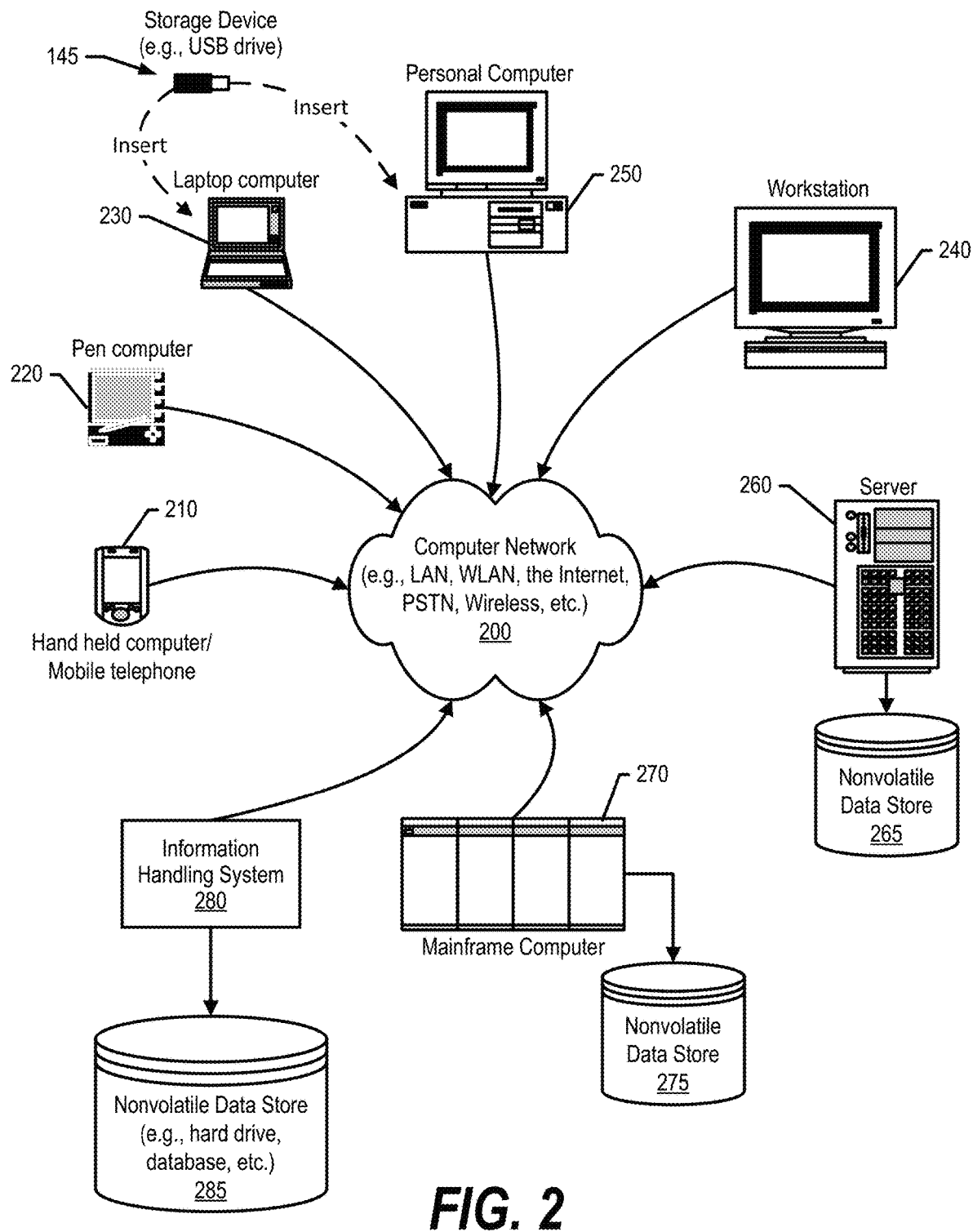
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 9 depict an approach that can be executed on an information handling system to optimize software code performance. As discussed in the Background section above, when using a JIT compiler to compile a program, it is desirable to make simplifying assumptions and, for every simplifying assumption made, the JIT compiler also adds a corresponding safe fallback path that detects and handles an incorrect assumption at runtime. Although the safe fallback paths are guaranteed to be correct, they typically reduce overall performance.

One approach of adding fallback paths is to add On Stack Replacement (OSR) conditional transitions immediately before each program point where simplifying assumptions are made. OSR conditional transitions facilitate the transition from a JIT compiled body (e.g., native machine code) to a virtual machine interpreter to execute the actual byte code (e.g., method call). The OSR conditional transitions are likely to be on very frequently executed program paths, which slows program performance and disrupts traditional program optimization analyses and transformations (e.g., loops may no longer appear well formed, etc.).

To reduce the total amount of conditional transitions added to the software program, the information handling system discussed herein identifies key assumption violation points though backwards propagation analysis, which are points within a software program where assumption violations may occur, and inserts conditional transitions at the key assumption violation points. As a result, the information handling system inserts a minimal amount of conditional transitions into the software program and, in turn, optimizing overall program performance.

The information handling system first inlines methods and adds HCR guards to the software program. Next, the information handling system replaces the HCR guards with 'assumption points,' which are locations at which compile-time assumptions are made by the compiler (e.g., a given method is not overridden). Then, the information handling system inserts 'assumption violation points' into the software program, which are locations at which the compile-time assumptions may be violated (e.g., a method redefinition or a write to a field assumed to be constant).

The information handling system, starting at the assumption points, propagates backwards in the software program and identifies the assumption violation points that are reached from the backwards propagation. At these identified points, the information handling system inserts conditional transitions, such as OSR transitions, that will check whether an assumption is violated at runtime. Once the JIT compiler finishes optimization, the JIT compiler compiles the program into native machine code and is ready for execution. At runtime, the information handling system checks executes the compiled code and, if the conditional transition determines that the assumption has been violated, the information handling system hands execution over to an interpreter that calls the redefined function (e.g., method). If the assumption has not been violated, the information handling system continues to execute the optimized native machine code.

Figure 3:
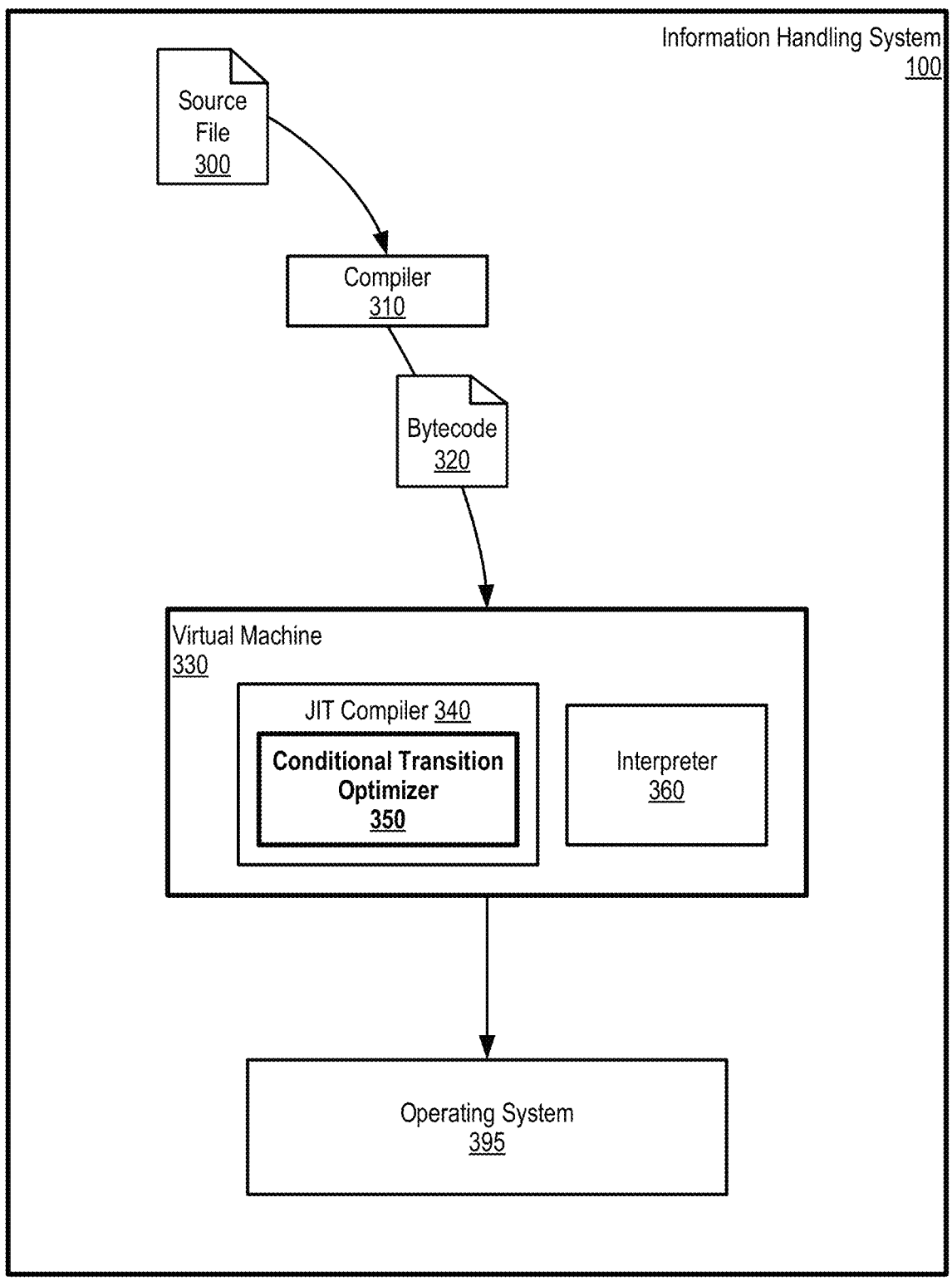
FIG. 3 is an exemplary diagram that includes a conditional transition optimizer that intelligently inserts conditional transitions in specific locations of a software program.

FIG. 3 is an exemplary diagram that includes a conditional transition optimizer that intelligently inserts conditional transitions in key locations of program code. Information handling system 100 includes virtual machine 330 that, in one embodiment, may be a Java Virtual Machine (JVM). In another embodiment, the approaches as discussed herein may be adapted for similar purposes in other languages or execution environments.

Compiler 310 transforms source file 300 into bytecode 320. Virtual machine (VM) 330 receives bytecode 320 and JIT compiler 340 transforms the bytecode into intermediate representations, also referred to as internal representations, which is what JIT compiler 340 analyzes, optimizes, and transforms into native machine code (see FIG. 4 and corresponding text for further details).

During optimization, JIT compiler 340 inlines methods in the bytecode by replacing the method calls with their corresponding intermediate representations. JIT compiler 340 then adds fallback paths as required by inserting HCR guards prior to the inlined methods (see FIG. 5 and corresponding text for further details). In one embodiment, JIT compiler 340 operates in the context of a Java HCR standard that states that currently executing instances of a replaced method may continue to execute and only subsequent method invocations see the new method implementation.

Then, as discussed in detail below, conditional transition optimizer 350 takes over to further optimize the program code by identifying specific locations in the program code that are required to check for invalided assumptions. Conditional transition optimizer 350 may be a separate module in JIT compiler 340 or may be integrated into JIT compiler 340.

Conditional transition optimizer 350 replaces the HCR guards with assumption points. As discussed herein, assumption points are points in the software program where simplifying assumptions were made by JIT compiler 340, as evidenced by locations of the HCR guards inserted by JIT compiler 340 (see FIG. 6 and corresponding text for further details).

Conditional transition optimizer 350 then identifies assumption violation points within the software program, which are points within the software program where the compile-time assumptions may be violated. In one embodiment, conditional transition optimizer 350 searches for operations that could cause a compile-time assumption to be invalidated, such as method redefinition or a write to a field assumed to be constant. In this embodiment, the application's threads are required to reach a safe point before the invalidation is allowed to proceed. In turn, in this embodiment, conditional transition optimizer 350 selects calls and asyncchecks as the points where invalidation is allowed to occur (assumption violation points) because JIT compiled code yields to the VM and may halt the thread's execution briefly to allow an invalidation operation to proceed. When a thread wishes to perform an invalidation operation, it must first request permission from the VM and this call may block the thread's execution until all threads in the application have arrived at safe points. Because it is necessary to ensure that all threads reach a safe point in a reasonable amount of time, the selection of calls and asyncchecks guarantees this by design. Furthermore, these points already yield control to the VM for other reasons and JIT compiler 340 is biased against including these program features in the mainline execution of the program due to this cost. As such, the method calls and asyncchecks from JIT compiler 340 are typically found on rarely executed code paths, which are ideal points for placing OSR transitions with a minimal impact on program performance.

Figure 7:
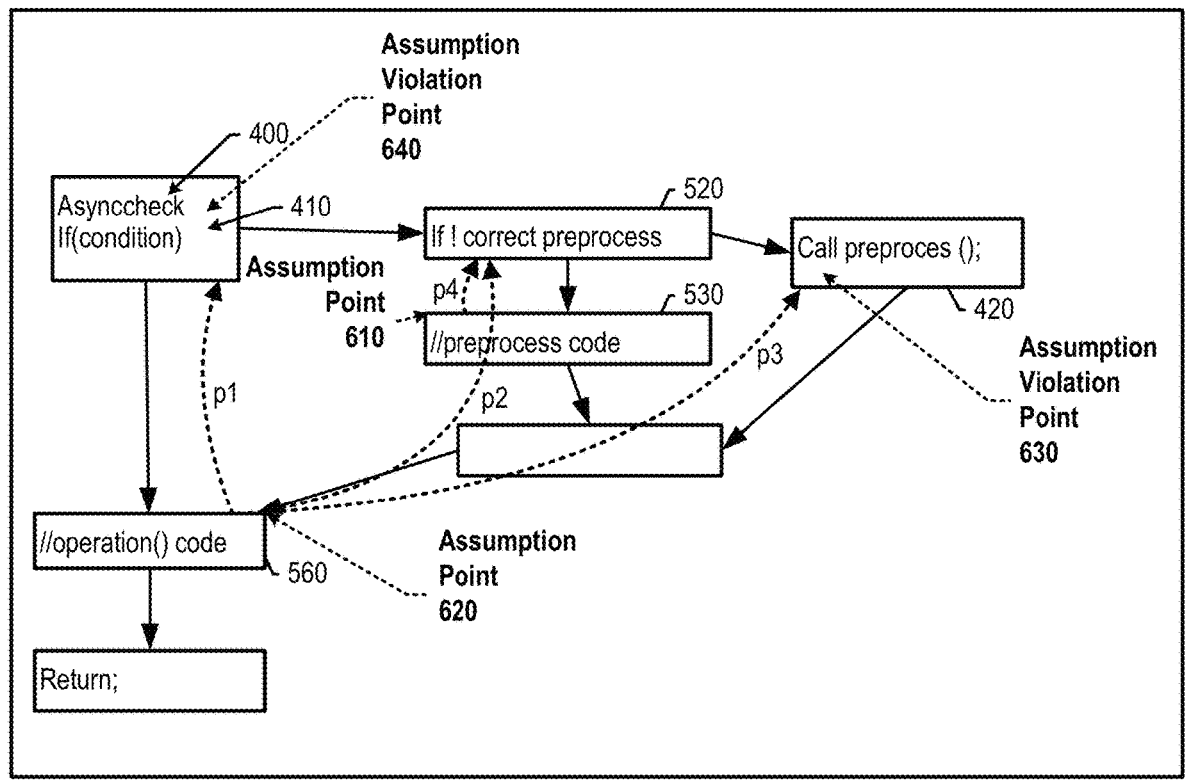
FIG. 7 is an exemplary diagram depicting assumptions propagated backwards through program paths to identify areas where the assumptions may be invalidated.

Once the assumption points and assumption violation points are selected, conditional transition optimizer 350 performs a backwards unioning dataflow analysis based on propagating backwards from the assumption points and identifying the assumption violation points that are reached from the backwards propagation (see FIG. 7 and corresponding text for further details). A data flow analysis is a program analysis which is used to determine the parts of a program to which a particular fact or value might propagate. As described herein, the term 'propagating backwards' is a backwards data flow analysis where the propagation of a fact or value is performed in the opposite direction to program execution order. A unioning dataflow analysis refers to a mathematical operation performed at merge points in the program control flow (e.g., where two or more different execution paths meet) to aggregate the data flow information reaching that merge. A 'union' in this sense means that a fact that arrives at a merge on any path is sufficient to have that fact in the result of the merge. Conditional transition optimizer 350 employs a backwards unioning data flow analysis to construct a set of invalidation points where conditional OSR transitions are required to preserve correct execution behavior. The result of the analysis is a minimal subset of assumption violation points that require OSR conditional transitions to prevent any of the assumption points from being reached with an invalid assumption (see FIG. 8 and corresponding text for further details).

Virtual machine 330 then commences program execution whereby JIT compiler 340 passes native machine code to operating system 395 and, when the inserted OSR transitions determine, execution is passed to interpreter 360 to execute bytecode.

In one embodiment, the backwards unioning dataflow analysis takes advantage of control-flow equivalence to further reduce the number of conditional transition points required. In addition, as discussed above, because of JIT compiler 340's placement of method calls and asyncchecks, the conditional transitions are typically located on infrequently executed program paths.

Figure 4:
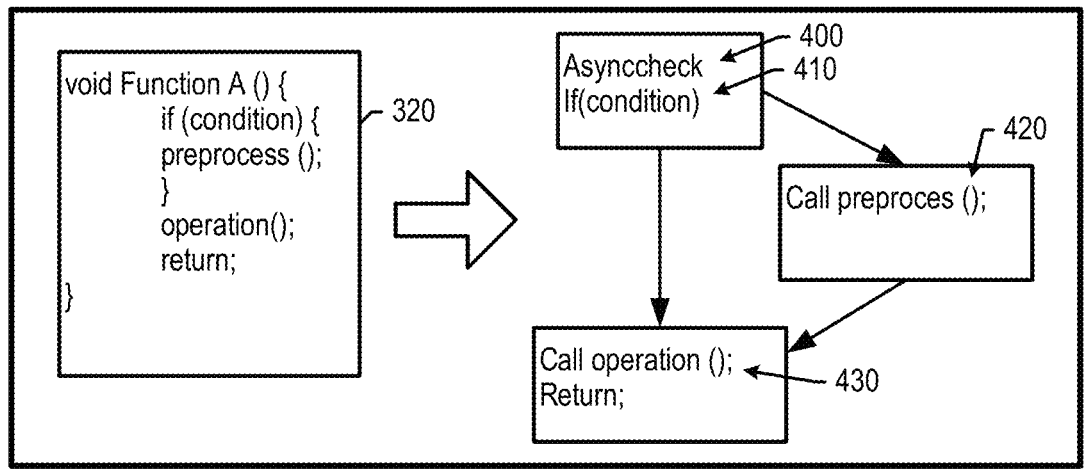
FIG. 4 is an exemplary diagram depicting a transformation of bytecode to intermediate representations by a JIT compiler.

FIG. 4 is an exemplary diagram depicting a transformation of bytecode to intermediate representations by a JIT compiler. Intermediate representation lines 400, 410, 420, and 430 are shown in a human readable format for purposes of discussion and, as those skilled in the art can appreciate, intermediate representations are typically in a machine readable format.

JIT compiler 340 receives bytecode 320 and transforms bytecode 320 into intermediate representation lines 400, 410, 420, and 430. When 'If condition' 410 is true, preprocess method 420 is called and, when 'If condition' 410 is false, processing bypasses preprocess method 420 and commences calling operation method 430. As discussed earlier, method calls are slow in performance due to the reduction in locality and context if JIT compiled or due to the use of the interpreter. Therefore, JIT compiler 340 replaces the method calls with intermediate representations of their target method where suitable according to control heuristics (see FIG. 5 and corresponding text for further details).

Figure 5:
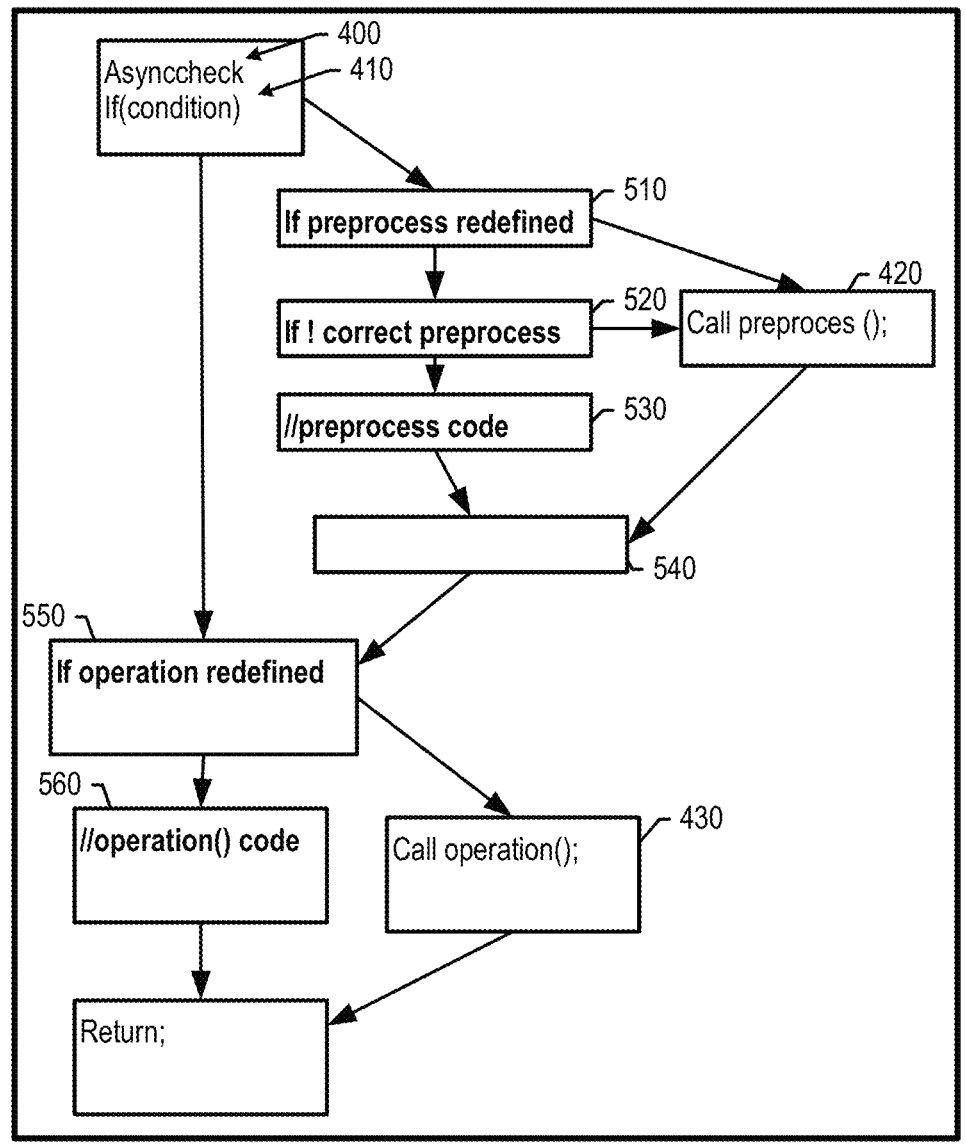
FIG. 5 is an exemplary diagram depicting method calls being replaced with intermediate representations of their target method and HCR/virtual guards added as fallback paths.

FIG. 5 is an exemplary diagram depicting method calls being replaced with intermediate representations of their target method and HCR/virtual guards added as fallback paths. JIT compiler 340 "inlines" preprocess method call 420 and operation method call 430 by adding preprocess code 530 and operation code 560 to the program paths, both of which are intermediate representations of their target method.

As discussed earlier, JIT compiler 340 is also required to put contingency plans in place when the preprocess method or the operation method are changed (redefined) prior to execution. As such, JIT compiler 340 adds HCR guards 510 and 550 accordingly. Therefore, when the preprocess method is not redefined, execution proceeds down the program path starting with line 510, to 520, and proceeds to //preprocess code 530. However, when the preprocess method is redefined, then preprocess method 420 is called by interpreter 360. Box 540 represents the merge between the two equivalent paths from 530 and 420, and their common edge to 550. Box 540 may include commands, etc., but the end box 540's commands point to line 550.

In one embodiment, JIT compiler 340 adds virtual guard 520 for speculative inlining of method bodies when the precise target method may not be determined at compile-time. The guard consists of a conditional branch above the inlined method body (either executed at runtime or a patch point to divert control-flow) and a safe fallback path which asks the VM to call the appropriate method before merging into the program control-flow again immediately after the inlined method body. The inlined body and the fallback call are control-flow equivalent. FIG. 5 shows that virtual guard 520 determines whether the preprocess method is correct and, if not, preprocess method 420 is called.

Likewise, when the operation method is not redefined, execution proceeds to //operation( ) code 560. However, when the operation method is redefined, then the program path proceeds from 550 to calling operation method 430. Now that the guards are in place, JIT compiler 340 removes the HCR guards and adds assumption points to the code as discussed herein to determine assumption violation points within the program paths, which are points at which the assumptions have a chance of being violated (see FIGS. 6, 7, and corresponding text for further details).

Figure 6:
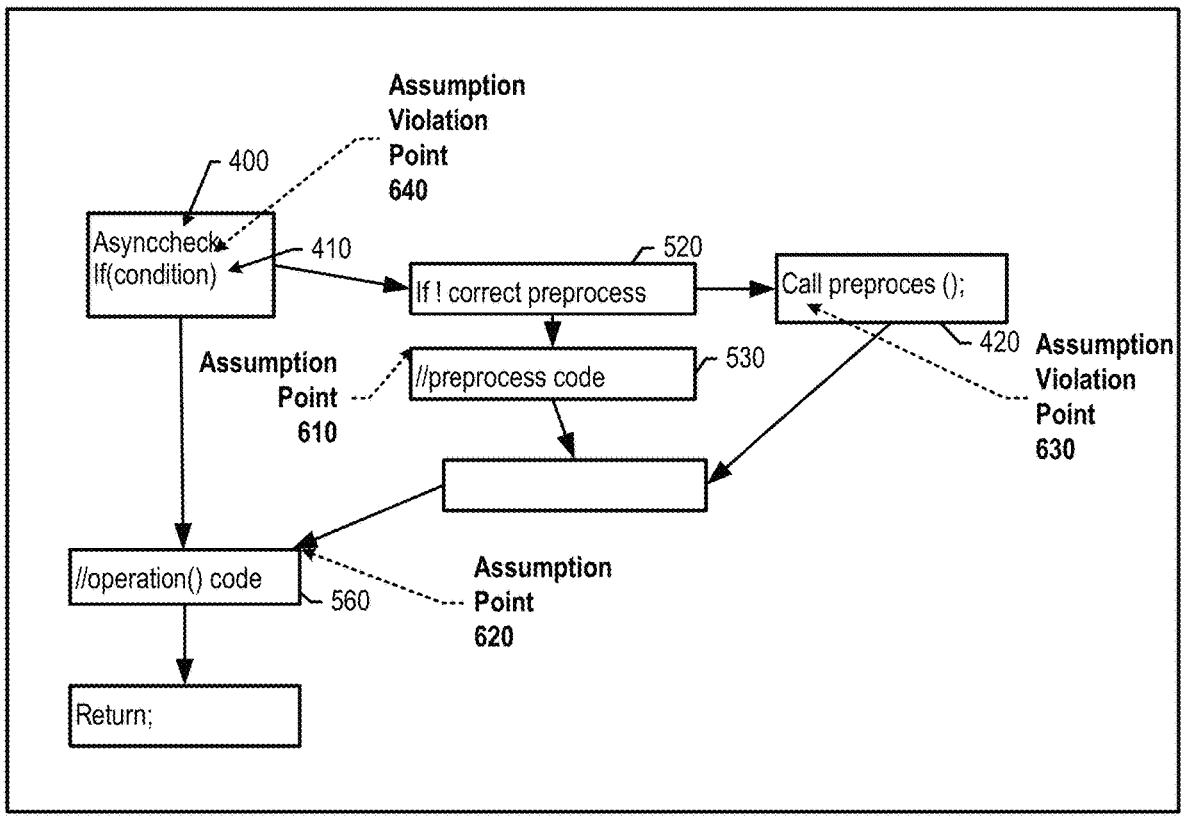
FIG. 6 is an exemplary diagram depicting JIT compiler replacing HCR guards with assumption points for subsequent back propagation analysis.

FIG. 6 is an exemplary diagram depicting JIT compiler replacing HCR guards with assumption points for subsequent back propagation analysis. Conditional transition optimizer 350 replaces HCR guard 550 with assumption point 620, and replaces HCR guard 510 with assumption point 610. Assumption point 610 is inserted before intermediate representation code 530 because intermediate representation code 530 is the code that would be invalidated if a redefinition occurred.

Conditional transition optimizer 350 identifies method calls and asyncchecks in the program code and inserts assumption violation points as discussed herein. FIG. 6 shows that conditional transition optimizer 350 inserts assumption violation point 640 after asynccheck 400 and inserts assumption violation point 630 after preprocess method call 420. At this point, conditional transition optimizer 350 may perform back propagation assumption analysis to identify the assumption violation points that require conditional transitions (see FIGS. 7, 8, and corresponding text for further details).

FIG. 7 is an exemplary diagram depicting assumptions propagated backwards through program paths to identify areas where the assumptions may be invalidated (assumption invalidation points). FIG. 7 shows that the backwards propagation paths of assumption point 620 are p1, p2, and p3. Backwards propagation path p1 shows that the backwards propagation reaches assumption violation point 640 and, therefore, a conditional transition is required (see FIG. 8, conditional transition 810). Likewise, backwards propagation path p3 shows that the backwards propagation reaches assumption violation point 630 and, therefore, a conditional transition is required. Backwards propagation path p2 stops at virtual guard 520 because virtual guard 520 would be modified to call preprocess method 420 in the event of its original check failing or the invalidation of any assumption that reached it. This protects assumption point 610 as it will call method preprocess( ) 420 rather than intermediate representation 530, and assumption point 620, as invalidation point 630 has a conditional transition in the event of assumption point 620 being invalidated (see FIG. 8, conditional transition 830).

In one embodiment, as discussed herein, the backwards propagation assumption analysis is based on a backwards unioning data flow analysis. The backwards propagation assumption analysis may be performed with a single bit of information whereby each program point in the set of assumption points is the set of gen points for the analysis, and each assumption violation point is a kill point for the analysis. In another embodiment, if it is desirable to know which assumption points reach each assumption violation point, another backwards propagation assumption analysis may be run but rather than having one bit of information per assumption point, each assumption point generates its own bit. In turn, the set of bits at a given assumption violation point dictate the assumptions that gate whether a given OSR transition point must cause the program execution to revert to interpreter 360 to preserve correctness.

In another embodiment, given the construction of virtual guards, conditional transition optimizer 350 may consider two cases of backwards propagation. The first case to consider is where an assumption is generated somewhere transitively inside an inlined method body and the assumption backward propagates out to that method's virtual guard (p4). This backwards propagation informs conditional transition optimizer 350 that there exists a path from the virtual guard to the assumption point along which there are no assumption invalidation points (otherwise the assumption propagation would have been stopped). As such, the assumption made at the assumption point being considered is only invalidated by an assumption invalidation point preceding the inlined method body. It is, therefore, sufficient to cause the virtual guard on the method concerned to force the inlined method to be called if the assumption point's assumption is invalidated because control is diverted around the assumption point. In other words, a virtual guard kills an assumption that is generated within the inlined body it protects.

The second case of backwards propagation to consider with virtual guards is where an assumption is generated somewhere below an inlined method body where the assumption propagates into the inlined method body, up through the body, to the inlined method's virtual guard (p2). This propagation informs conditional transition optimizer 350 of two things. First, there exists a path from the assumption point through to the virtual guard of the inlined method along which there are no assumption invalidation points (if there were any, they would have stop the assumption propagation) and so assumption invalidations that occur above the inlined method are a concern. Second, the assumption will not reach the virtual guard through the guard's fallback path because there is at least one assumption invalidation point on that path, namely the fallback call. This means that not only can a virtual guard stop the propagation of assumption which originates transitively within the inlined method body it protects, but that it also can stop the propagation of assumption from below the inlined method body by forcing execution to continue along the control-flow equivalent fallback path along which there must be at least one transition point. In one embodiment, to check for the assumption propagation from inside a body to a virtual guard, conditional transition optimizer 350 checks the relationship between the method where the assumption was generated to the method on the virtual guard that it reached using, for example, an inlining table (a record that identifies the methods that were inlined and at what locations).

In yet another embodiment, it is possible to extend this analyses to exploit control-flow equivalence at other program points, for example, at different versions of a loop created by the optimizer, header blocks of unrolled loop bodies, etc. The analysis forces execution onto control-flow equivalent, rarely-executed paths with a guaranteed transition point when a compile-time assumption is violated to prevent adding a transition point into the most frequently executed portions of the program.

Figure 8:
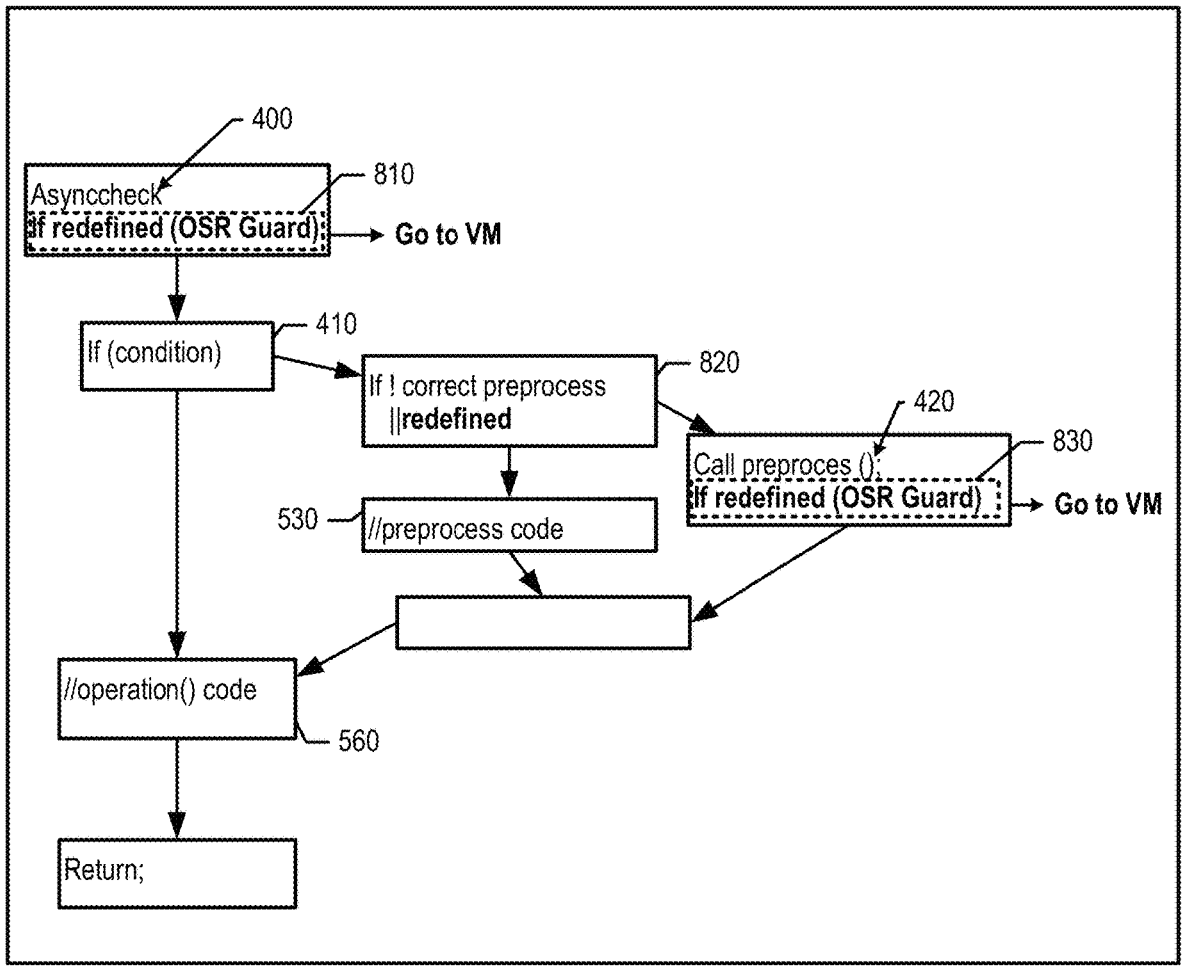
FIG. 8 is an exemplary diagram depicting a conditional transition optimizer adding OSR guards at identified assumption violation points.

FIG. 8 is an exemplary diagram depicting conditional transition optimizer 350 adding OSR guards at identified assumption violation points. From the back propagation assumption analysis shown in FIG. 7, conditional transition optimizer 350 determined that OSR guard 810 is required after asynccheck 400 to prevent the execution of operation code 560 after an assumption violation during asynccheck 400. As such, if operation method 430 is redefined, then OSR guard 810 transitions execution to interpreter 360 to continue execution and call operation method 430.

Likewise, conditional transition optimizer 350 determined that OSR guard 830 is required after preprocess method call 420 to prevent the execution of operation code 560 after an assumption violation during preprocess method call 420. As such, if operation method is redefined, then OSR guard 820 transitions execution to interpreter 360 to continue execution and call operation method 430.

In some embodiments, during code generation, the virtual guards are turned into patch points and the location in the instruction stream of the patch points are recorded. The runtime assumptions are also registered for an OSR guard that identifies the corresponding methods that are being protected. Then, when a method is about to be redefined during code execution, virtual machine 330 calls code in JIT compiler 340, which checks the list of assumptions and any that match the method being redefined is triggered. In turn, the location in the instruction stream where the corresponding trigger points are will have an unconditional jump to the OSR transition written.

In some embodiments, the conditional transition is implemented by a runtime code patching framework during execution that modifies registered positions in the compiled software program based on runtime events.

Figure 9:
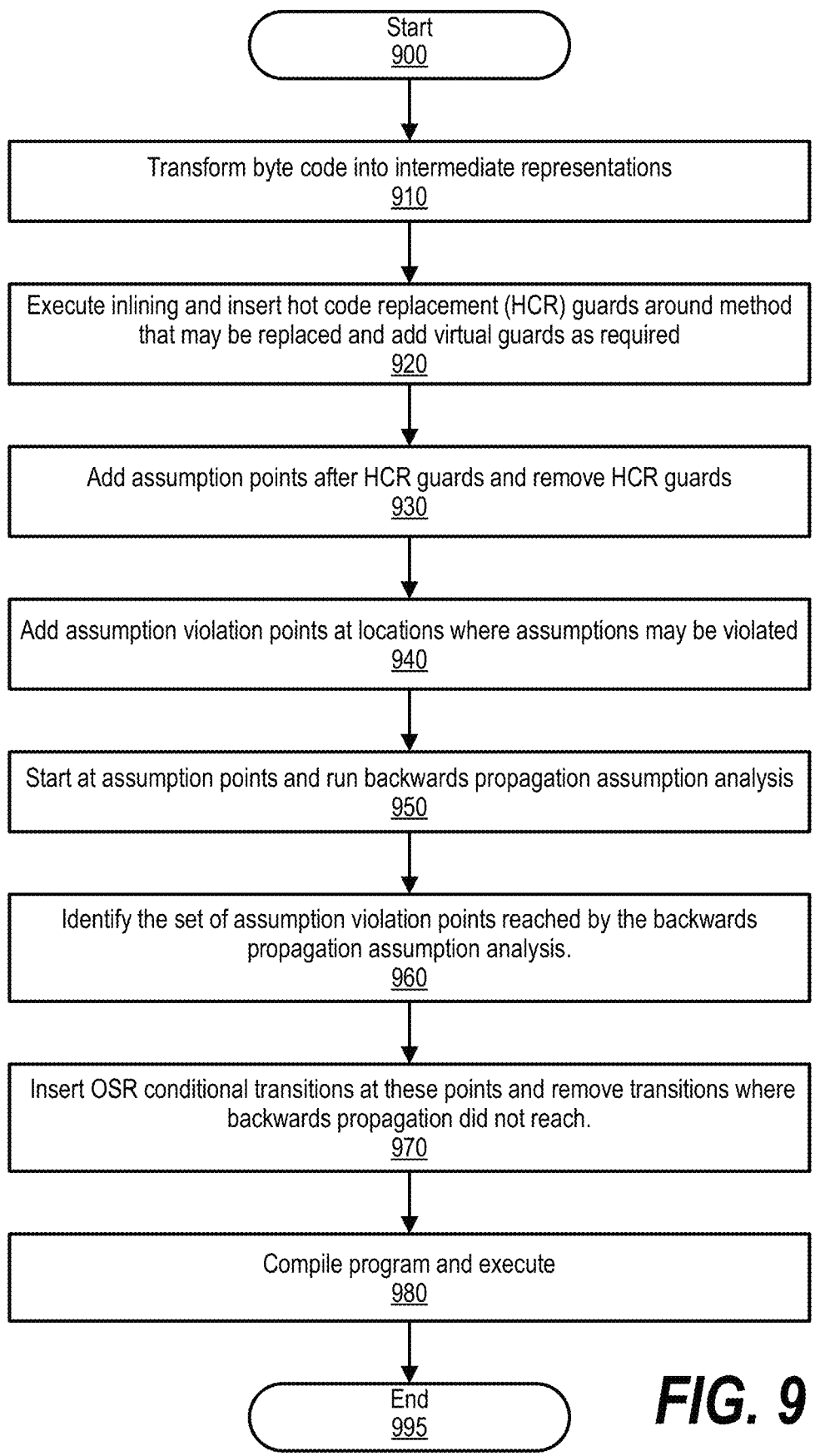
FIG. 9 is an exemplary diagram depicting steps taken to optimize program code during JIT compilation.

FIG. 9 is an exemplary diagram depicting steps taken to optimize program code during JIT compilation. FIG. 9 processing commences at 900 whereupon, at step 910, the process transforms byte code into intermediate representations, such as by using an IL generation process. At step 920, the process replaces method calls with intermediate representations of their target method (inlining) and inserts hot code replace (HCR) guards around those intermediate representations that may be replaced. The process also adds virtual guards as required for speculative inlining of method bodies when the precise target method cannot be determined at compile-time.

At step 930, the process replaces the HCR guards with assumption points and, at step 940, the process adds assumption violation points at locations where assumptions may be violated. As discussed above, the assumption violation points may be operations that could cause a compile-time assumption to be invalidated, such as method redefinition or a write to a field assumed to be constant.

Next, at step 950, the process starts at the assumption points and commences backwards propagation assumption analysis, which may be performed using backwards unioning dataflow analysis as discussed herein.

In one embodiment, conditional transition optimizer 350 runs the backwards propagation assumption analysis immediately after inlining such that the representations of the different method bodies are still distinct. The intermediate representation for the first bytecode of any inlined method with a removed HCR guard is identified as an assumption point. During backwards propagation assumption analysis, the process may identify cases where assumptions are generated somewhere transitively inside an inlined method body and the assumption propagates out to that method's virtual guard. In an embodiment where virtual guards and assumptions each have an associated inlined method, the process checks the relationship between the method where the assumption originated and that of the virtual guard using an inlining table. The process can then verify the virtual guard encloses the assumption point or if it originates below. Also, during backwards propagation assumption analysis, the process identifies cases where assumptions are generated somewhere below an inlined method body and the assumption propagates into the inlined method body, up through the body, to the inlined method's virtual guard. In one embodiment, the detection approach is similar to step 950 above with the exception that the result of checking the relationship between the assumption point's method and the virtual guard's method is that they do not share a caller-callee relationship.

At step 970, the process determines the set of assumption violation points reached by the back propagation assumption analysis. At these points, the process inserts OSR transitions and removes transitions where the back propagation assumption analysis did not reach (step 970). At step 980, the process finishes compiling the program and is ready for execution. FIG. 9 processing thereafter ends at 995.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
    selecting an assumption point in a software program corresponding to a compile-time assumption made by a compiler;
    selecting an assumption violation point corresponding to a location in the software program at which the compile-time assumption can be violated at runtime;
    in response to propagating backwards in the software program from the assumption point and reaching the assumption violation point:
        determining that the assumption point corresponds to a first method and the assumption violation point corresponds a second method that is different from the first method; and
        inserting a conditional transition in the software program at the assumption violation point in response to the determining; and
    executing a compiled version of the software program that comprises the conditional transition.

2. The method of claim 1 further comprising:
    selecting a different assumption point in the software program corresponding to a different compile-time assumption made by the compiler;
    selecting a different assumption violation point corresponding to a different location in the software program at which the different compile-time assumption can be violated at runtime; and
    in response to propagating backwards in the software program from the different assumption point and reaching the different assumption violation point:
        removing the different assumption point in response to determining that the different assumption point and the different assumption violation point both correspond to the first method.

3. The method of claim 1 wherein, prior to the selecting, the method further comprises:
    replacing a method call corresponding the first method with an intermediate representation of the first method;
    inserting hot code replace (HCR) guard above the intermediate representation; and
    performing the backwards propagation subsequent to the inserting of HCR guard while the intermediate representation is distinct from a different intermediate representation corresponding to a different method.

4. The method of claim 3 wherein:
    the intermediate representation is generated from bytecode; and
    the conditional transition is an on stack replacement transition.

5. The method of claim 1 wherein the selecting of the assumption point further comprises:
    identifying a guard in the software program that checks whether the first method is redefined; and
    replacing the guard with the assumption point, wherein the assumption point corresponds to an assumption that the first method is not redefined during the executing of the compiled version of the software program.

6. The method of claim 1 wherein the propagating backwards further comprises:
    performing a backwards unioning data flow analysis using the assumption point and the assumption violation point.

7. The method of claim 1 wherein the conditional transition is implemented by a runtime code patching framework during execution, and wherein the runtime code patching framework modifies at least one registered position in the compiled version of the software program based on one or more runtime events.

8. An information handling system comprising:
one or more processors;
a memory coupled to at least one of the processors;
a set of computer program instructions stored in the memory and executed by at least one of the processors in order to perform actions of:
selecting an assumption point in a software program corresponding to a compile-time assumption made by a compiler;
selecting an assumption violation point corresponding to a location in the software program at which the compile-time assumption can be violated at runtime;
in response to propagating backwards in the software program from the assumption point and reaching the assumption violation point:
determining that the assumption point corresponds to a first method and the assumption violation point corresponds a second method that is different from the first method; and
inserting a conditional transition in the software program at the assumption violation point in response to the determining; and
executing a compiled version of the software program that comprises the conditional transition.

9. The information handling system of claim 8 wherein the processors perform additional actions comprising:
selecting a different assumption point in the software program corresponding to a different compile-time assumption made by the compiler;
selecting a different assumption violation point corresponding to a different location in the software program at which the different compile-time assumption can be violated at runtime; and
in response to propagating backwards in the software program from the different assumption point and reaching the different assumption violation point:
removing the different assumption point in response to determining that the different assumption point and the different assumption violation point both correspond to the first method.

10. The information handling system of claim 8 wherein, prior to the selecting, the processors perform additional actions comprising:
replacing a method call corresponding the first method with an intermediate representation of the first method;
inserting hot code replace (HCR) guard above the intermediate representation; and
performing the backwards propagation subsequent to the inserting of HCR guard while the intermediate representation is distinct from a different intermediate representation corresponding to a different method.

11. The information handling system of claim 10 wherein:
the intermediate representation is generated from bytecode; and
the conditional transition is an on stack replacement transition.

12. The information handling system of claim 8 wherein the processors perform additional actions comprising:
identifying a guard in the software program that checks whether the first method is redefined; and
replacing the guard with the assumption point, wherein the assumption point corresponds to an assumption that the first method is not redefined during the executing of the compiled version of the software program.

13. The information handling system of claim 8 wherein the processors perform additional actions comprising:
performing a backwards unioning data flow analysis using the assumption point and the assumption violation point.

14. The information handling system of claim 8 wherein the conditional transition is implemented by a runtime code patching framework during execution, and wherein the runtime code patching framework modifies at least one registered position in the compiled version of the software program based on one or more runtime events.

15. A computer program product stored in a computer readable storage medium, comprising computer program code that, when executed by an information handling system, causes the information handling system to perform actions comprising:
selecting an assumption violation point corresponding to a location in the software program at which the compile-time assumption can be violated at runtime;
in response to propagating backwards in the software program from the assumption point and reaching the assumption violation point:
determining that the assumption point corresponds to a first method and the assumption violation point corresponds a second method that is different from the first method; and
inserting a conditional transition in the software program at the assumption violation point in response to the determining; and
executing a compiled version of the software program that comprises the conditional transition.

16. The computer program product of claim 15 wherein the information handling system performs further actions comprising:
selecting a different assumption point in the software program corresponding to a different compile-time assumption made by the compiler;
selecting a different assumption violation point corresponding to a different location in the software program at which the different compile-time assumption can be violated at runtime; and
in response to propagating backwards in the software program from the different assumption point and reaching the different assumption violation point:
removing the different assumption point in response to determining that the different assumption point and the different assumption violation point both correspond to the first method.

17. The computer program product of claim 15 wherein, prior to the selecting, the information handling system performs further actions comprising:
replacing a method call corresponding the first method with an intermediate representation of the first method;
inserting hot code replace (HCR) guard above the intermediate representation; and
performing the backwards propagation subsequent to the inserting of HCR guard while the intermediate representation is distinct from a different intermediate representation corresponding to a different method.

18. The computer program product of claim 17 wherein:
the intermediate representation is generated from bytecode; and the conditional transition is an on stack replacement transition.

19. The computer program product of claim 15 wherein the information handling system performs further actions comprising:
    identifying a guard in the software program that checks whether the first method is redefined; and
    replacing the guard with the assumption point, wherein the assumption point corresponds to an assumption that the first method is not redefined during the executing of the compiled version of the software program.

20. The computer program product of claim 15 wherein the information handling system performs further actions comprising:
    performing a backwards unioning data flow analysis using the assumption point and the assumption violation point.

* * * * *